Feb. 16, 1943.    J. L. DOUGLASS    2,310,944
TUBE COUPLING
Filed Sept. 9, 1940

INVENTOR
James L. Douglass
BY Evans & McCoy
ATTORNEYS

Patented Feb. 16, 1943

2,310,944

UNITED STATES PATENT OFFICE 2,310,944

TUBE COUPLING

James L. Douglass, Cleveland Heights, Ohio

Application September 9, 1940, Serial No. 355,886

3 Claims. (Cl. 285—86)

This invention relates to tube couplings or fittings, and particularly to couplings for metal tubes to which other tubes or parts are to be connected.

It has heretofore been proposed to provide couplings for attaching metal tubes together and to other fittings by squeezing a flared end of said tube between tapered sealing surfaces, one of which is adapted to contact the inner surface of the flared end of the tube and the other of which is adapted to contact the outer surface of the flared end of the tube. Commercial forms of such couplings require very difficult manufacturing operations, special tools being needed and substantial loss due to breakage occurring.

It is an object of the present invention to provide an improved coupling of simple form and which can be produced in quantity production without the use of special tools.

It is another object of the present invention to provide a tight joint between the tube and coupling members which will withstand practical pressures and which has no appreciable tendency to become loosened by vibration.

Another object is to provide a coupling having a design which permits the use of much harder materials but which provides a superior seal, making the couplings especially advantageous for use in aircraft work and the like.

Another object of this invention is to provide a coupling which can be readily and economically produced, and which has a locking action due to relative yieldableness or expansion of its parts.

Other objects will be apparent from the following description of the invention, as illustrated by the accompanying drawing, in which.

Figure 1:
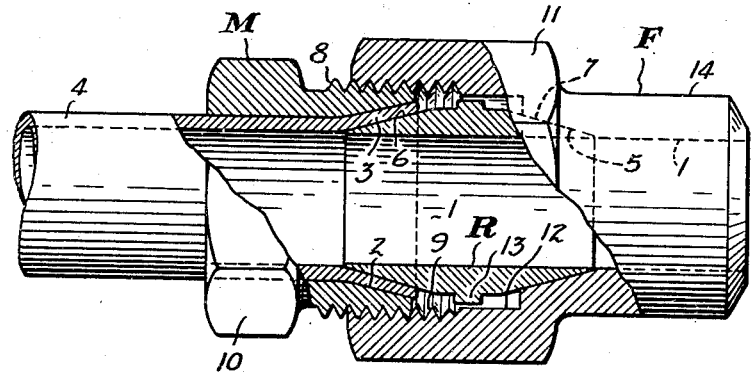
Figure 1 is an elevational view of a portion of a tube and coupling in assembled position, and partly in section, to show the internal construction of the coupling.

Referring more particularly to the drawing, in which like parts are indicated by like numerals of reference throughout the several views, it will be seen that my improved coupling comprises a male member M, a female member F, and an internal tubular sealing ring member R, all of which are provided with a bore or passageway 1 to conduct fluid through the coupling. The male member M is provided with a tapered seat 2 adapted to surround and contact the external surface of a flared end 3 of a tube 4 when the tube is inserted through the member M and properly disposed with respect thereto. The contact between the seat 2 and the tube end 3 should be at least a continuous line running circumferentially around the seat or flared tube end to aid in sealing the interior of the tube and insure that there will be no leakage at the coupling. The female member F is also provided on its interior with a tapered seat 5 which, however, is directed oppositely from the seat 2 on the male member. The ring R is provided on its exterior with two external seats 6 and 7 which are tapered in opposite directions away from the middle portion of the ring and cooperate respectively with the seats 2 and 5 of the members M and F to secure the tube to the coupling and to seal the interior of the tube against leakage at the coupling. When the tube and coupling are assembled, the seat 6 engages the interior of the flared end 3 of the tube 4 and coacts with the seat 2 engaging the exterior of the flared tube end to securely hold the tube to the coupling. The seat 7 engages and coacts with the seat 5 to seal the passageway 1 against leakage. The seats 2, 5, 6 and 7 are so formed that the bore of the member F and the ring R are substantially in registry with each other and with the bore of the tube 4 when the coupling parts are assembled.

Figure 2:
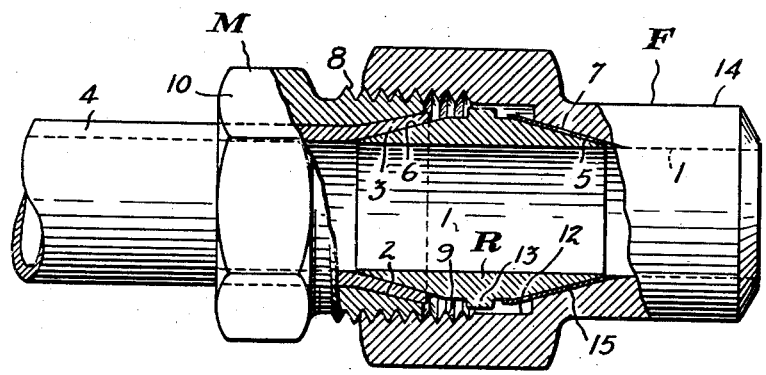
Fig. 2 is a view similar to Fig. 1, illustrating a modified form of coupling wherein use is made of soft metal or other suitable material to more readily effect a seal.
Figure 3:
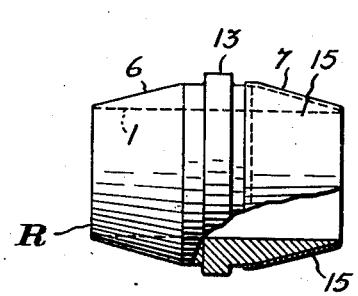
Fig. 3 is an elevational view of one of the component parts of the couplings shown in Figs. 1 and 2.

To provide for axial movement of the members M and F relative to each other, the member M is provided with a threaded portion 8 exteriorly of the tapered seat 2, while an open end of the member F is provided with an interior threaded portion 9 spaced from the seat 5. The members M and F may also have suitably formed external portions 10 and 11, respectively, to accommodate or receive suitable wrenches. As shown in Figs. 1 and 2, these portions 10 and 11 have a hexagonal contour in cross section, but any suitable contour may be employed.

On the interior of the member F between the threaded portion 9 and the seat 5 is disposed a cylindrical bore 12, the diameter of which is greater than the largest internal diameter of the seat 5. This cylindrical bore 12 is adapted to receive with a rather loose fit a circumferential aligning rib 13 disposed on the exterior of the member R and to cooperate with the rib 13 to properly position the member R and prevent misalignment of the member R during assembly. To facilitate easy assembly of the coupling and quick insertion of the member R, it is preferably made to have a greater length than its largest diameter, which is measured at the rib 13.

The end of the member F opposite the threaded portion terminates in a cylindrical portion 14. If desired, the cylindrical end portion 14 of the member F may be threaded externally or internally or otherwise prepared for attachment to other members, as desired.

The portions of the male and female members carrying the tapered seats 2 and 5, respectively, and the portions of the ring having the sealing surfaces 6 and 7 are dimensioned and positioned relative to each other and the tube end 3, so that when the male and female members are threaded together with said ring in position with the surfaces 6 and 7 substantially concentric with the internal threads of the member F, the tapered surface 7 of the ring R is brought to bear against the tapered seat 5 to form intimate sealing contact therewith, and the oppositely disposed sealing surface 6 of the ring R and the remaining tapered seat 2 are brought into intimate sealing contact with the inner and outer surfaces, respectively, of the flared end 3 of the tube 4.

A modified form of coupling shown in Fig. 2 is substantially identical with the coupling shown in Fig. 1 except that a coating or film 15 of a suitable material, such as a soft or malleable metal, a rubber compound, an adhesive, or the like, is applied to either the tapered seat 7 of the ring member or the seat 5 of the female member, or both. Of course, the coating or film 15 may also be applied to either or both of the seats 2 and 6, if desired. When one or both of the tapered engaging surfaces are coated with a soft or malleable metal, such as tin or lead, or some other suitable coating, a superior sealing engagement is obtained between such surfaces, even though those surfaces have not been burnished or ground to a high degree of smoothness before coating.

In assembling the coupling the member M is inserted onto a plain tube and the end of the tube is then flared approximately to the position shown in Figs. 1 and 2. The ring member R may then be positioned either with its tapered seat 6 in engagement with the interior of the flared end of the tube 4 or with its tapered seat 7 in engagement with the tapered seat 5 of the member F. Next, the male member may be positioned with respect to the open end of the female member and moved axially together so that the threaded portions 8 and 9 of the members M and F, respectively, are in engagement. The members M and F are moved axially together until the seat 7 and the seat 5 are in sealing engagement, while the seat 6 and the seat 2 are in sealing engagement with the interior and exterior, respectively, of the flared tube end 3. Further tightening of the members M and F causes a tighter engagement between the various seats and a compressive gripping of the flared tube end, since the circumferential aligning rib 13 is free to move axially within the bore 12. The tapered seat 6 of the ring member slightly expands the threaded portion 8 of the member M since its cross sectional area is less than that of the other parts of the coupling. Expansion of the flared end of the member M causes the threaded portion 8 to tightly grip the threaded portion 9 of the member F and thus lock the members M and F so that they are not readily loosened by vibration.

The degree of taper of the seats 5 and 7 should be relatively slight, that is within a range of about 10 to 30 degrees, so that the seats 5 and 7 may be relatively long to provide a very tight engagement between the member R and the member F. It is desirable that the taper be somewhat above 10 degrees in order that the member R may readily adjust itself with respect to the seat 5 to take care of any eccentricity in the threaded engagement between the members M and F. It has been found that when the elements of the tapered surfaces 5 and 7 form an angle of 15 degrees with the axis of the member R, the sealing engagement between the members R and F is very advantageous and this degree of taper is sufficient to permit member R to readily adjust itself on account of any eccentricity in the threaded engagement between the members M and F.

It is desirable that the taper of the seats 2 and 6 be identical to properly grip the inside and outside of the flared tube end and obtain a tight engagement therewith. This taper should be relatively great, that is, about 20 to 30 degrees, so that the seats 2 and 6 will securely hold the flared tube end and at the same time the coupling will not be unduly elongated.

Figure 4:
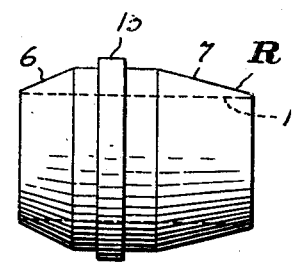
Fig. 4 is an elevational view of a modified form of sealing member for use in a modified coupling embodying the present invention.

A modified form of ring member is illustrated in Fig. 4, in which the tapered seat 7 is disposed at an angle of 15 degrees with the axis of the ring member, while the tapered seat 6 at the opposite end of the ring member is disposed at an angle of 25 degrees with the axis of the member R. In a coupling employing a ring member of this type, the seat 5 of the female member, which cooperates with the seat 7 to provide sealing engagement, will of course have a taper of 15 degrees so as to be parallel with tapered seat 7. Similarly, the tapered seat 2 of the male member, which cooperates with the tapered seat 6 to grip the exterior and interior of the flared tube end, will have a taper angle of 25 degrees to correspond with the taper of the seat 6.

It may be seen that the coupling of the present invention is very advantageous in that the members M and F, and in particular the tapered seats 2 and 5 thereof, may be readily formed without the use of special tools and without the high degree of breakage encountered in the manufacture of other couplings of this type. These tapered sealing surfaces are relatively easy to reach and may thus be given a smoother finish without a great increase in cost, allowing a very high quality coupling to be produced relatively inexpensively. Further, it may be seen that the ring member R may be manufactured in large quantities at low cost, and its tapered seats 6 and 7 may be provided with a smooth finish very readily. Since the tapered seats of the various members are easily accessible during fabrication thereof, the coupling parts may be made of much harder and tougher materials than are used in the manufacture of present commercial couplings which employ tapered surfaces to grip a flared end of a tube. This feature of the present invention makes the present coupling highly desirable for use in aircraft tubing, such as is used for oil lines, gas lines and the like on aircraft.

The coupling of the present invention is also very advantageous where the tubing to be connected is used to conduct deleterious substances, such as corrosive liquids or gases, and the like. In such applications it is necessary to use stainless steel tubing and the coupling shown in the drawings may be readily adapted for the connecting of tubes made of stainless steel and similar hard and corrosion-resistant metals. For such uses, the component parts of the coupling may readily be formed from stainless steel, or other hard material, whereas in the past these coupling parts have of necessity been made from softer materials since their design would not permit economic manufacture from harder materials on a commercial scale.

Another feature of the present invention, in addition to the fact that its design permits the use of much harder metals than heretofore possible, is that by the provision of a separate member R, having one seat cooperating with the seat of the male member to grip the flared tube end and another seat to have sealing engagement with the seat of the female member, an adjustment is permitted so that sealing engagement is maintained even though there be slight eccentricity in the threaded engagement between the male and female members. That is, it many times happens during the tapping of a member, such as the member F, that the threaded portion thereof is not entirely concentric with the axis of the bore therethrough. In the present coupling the member R may compensate for any eccentricity by a slight movement due to the pressure of the tapered seat 2 of the male member and an excellent sealing engagement between the seats 5 and 7 may be maintained. This feature is also enhanced by the use of a suitable coating between the tapered seats 5 and 7. If a coating of a malleable metal is used therebetween such as lead or tin, the eccentricity of the threaded engagement between the male and female members will cause the ring member R to be pressed against the seat 5 of the female member with greater force at some locations than at others. Where this force is high, the soft coating may flow and the sealing engagement between the members R and F is maintained.

A superior seal is also obtained by the present coupling which is not susceptible to loosening due to vibration of the tube or coupling because of the previously described locking action between the threaded portions of the members M and F.

It is to be understood that variations and modifications of the specific devices herein shown and described for purposes of illustration may be made without departing from the spirit of the invention.

What I claim is:

1. A tube coupling device comprising cooperatively threaded male and female members and an internal tubular sealing member having an intermediate external circumferential aligning rib and tapered sealing surfaces extending in opposite directions away from said aligning rib, one of said tapered surfaces being adapted to extend into and engage the inner surface of a flared end of a tube, said male member having a bore to receive the tube and having a tapered seat adapted to surround and contact the outer surface of the flared end of said tube, the female member having a substantially cylindrical bore and having a tapered seat adapted to surround one of the sealing surfaces of said tubular member and to cooperate therewith to form a fluid seal when the tubular member is pressed longitudinally thereagainst, an outer portion of the bore of the female member being internally threaded, the remaining portion of the bore being slightly larger in diameter than the diameter of said aligning rib to cooperate with the outer surface of said rib for maintaining said tubular member substantially centrally of the female member, the sides of said rib being substantially spaced from the end of the bore and the end of the male member, so that when the male and female members are threaded together with the tubular member in position, one of the tapered surfaces of said tubular member will form a seal with the tapered seat of the female member, and the oppositely disposed sealing surface of the female member and the inner tapered surface of the male member will form a seal with the flared end of the tube to be coupled and the entire thrust will be taken upon the tapered surfaces of the male and female members.

2. A tube coupling device comprising a female member having a wrench-engaging portion provided with an axial bore and a cylindrical attaching portion of smaller axial bore, the bore of said wrench-engaging portion being threaded over a part of its length, a conical sealing surface disposed between the internal bores of the attaching portion and the wrench-engaging portion, a tubular sealing member mounted internally of and substantially encased by said female member and having oppositely tapered external conical sealing surfaces on opposite end portions, a circumferential aligning rib carried by the tubular member between said conical surfaces and having a slightly less diameter than the internal bore of the wrench-engaging portion of said female member, the periphery of said rib cooperating with the surrounding internal bore of the female member to maintain the tubular member substantially centrally of the female member, said rib having a side portion facing the male member, and a male member having an externally threaded portion for threaded engagement with the internal threaded bore of said female member and an external wrench-engaging portion, said male member being provided with an internal conical sealing surface adjacent its threaded end portion for engaging the flared end of a tube and clamping said tube against a sealing surface of the tubular sealing member, said rib between the sealing surfaces of the tubular member having axial clearance with the assembled male and female members, whereby all sealing pressure is taken upon the tapered sealing surfaces of the male and female members.

3. A tube coupling device comprising a female member having a wrench-engaging portion provided with an axial bore and a cylindrical attaching portion of smaller axial bore, the bore of said wrench-engaging portion being threaded over a part of its length, a conical sealing surface disposed between the internal bores of the attaching portion and the wrench-engaging portion, a tubular sealing member having greater length than its maximum diameter mounted internally of and substantially encased by said female member and having oppositely tapered external conical sealing surfaces on opposite end portions, a circumferential aligning rib carried by the tubular member between said conical surfaces and having a slightly less diameter than the internal bore of the wrench-engaging portion of said female member, the periphery of said rib cooperating with the surrounding internal bore of the female member to maintain the tubular member substantially centrally of the female member, said rib having a side portion facing the male member, and a male member having an externally threaded portion for threaded engagement with the internal threaded bore of said female member and an external wrench-engaging portion, said male member being provided with an internal conical sealing surface adjacent its threaded end portion for engaging the flared end of a tube and clamping said tube against a sealing surface of the tubular sealing member, said rib between the sealing surfaces of the tubular member having axial clearance with the assembled male and female members, whereby all sealing pressure is taken upon the tapered sealing surfaces of the male and female members.

JAMES L. DOUGLASS.